UNITED STATES PATENT OFFICE.

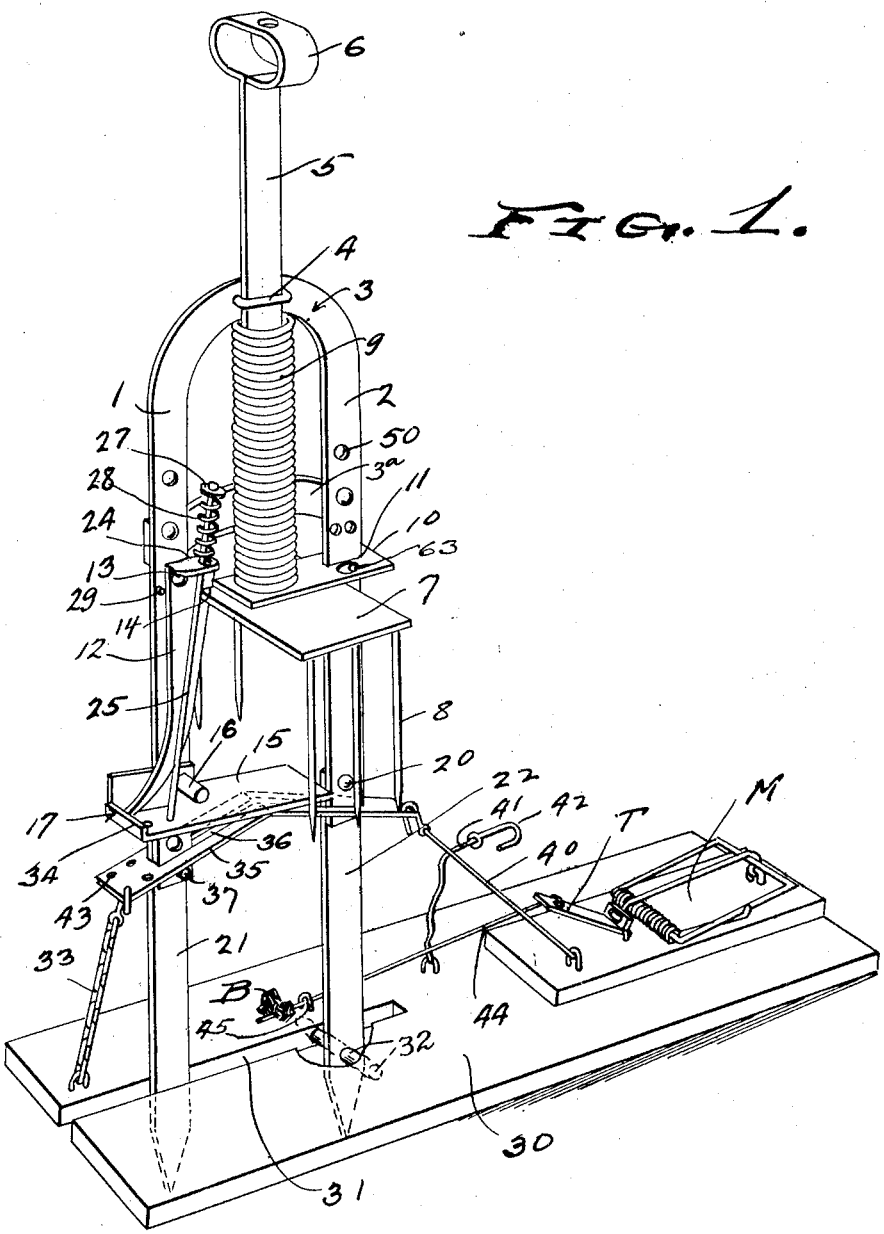

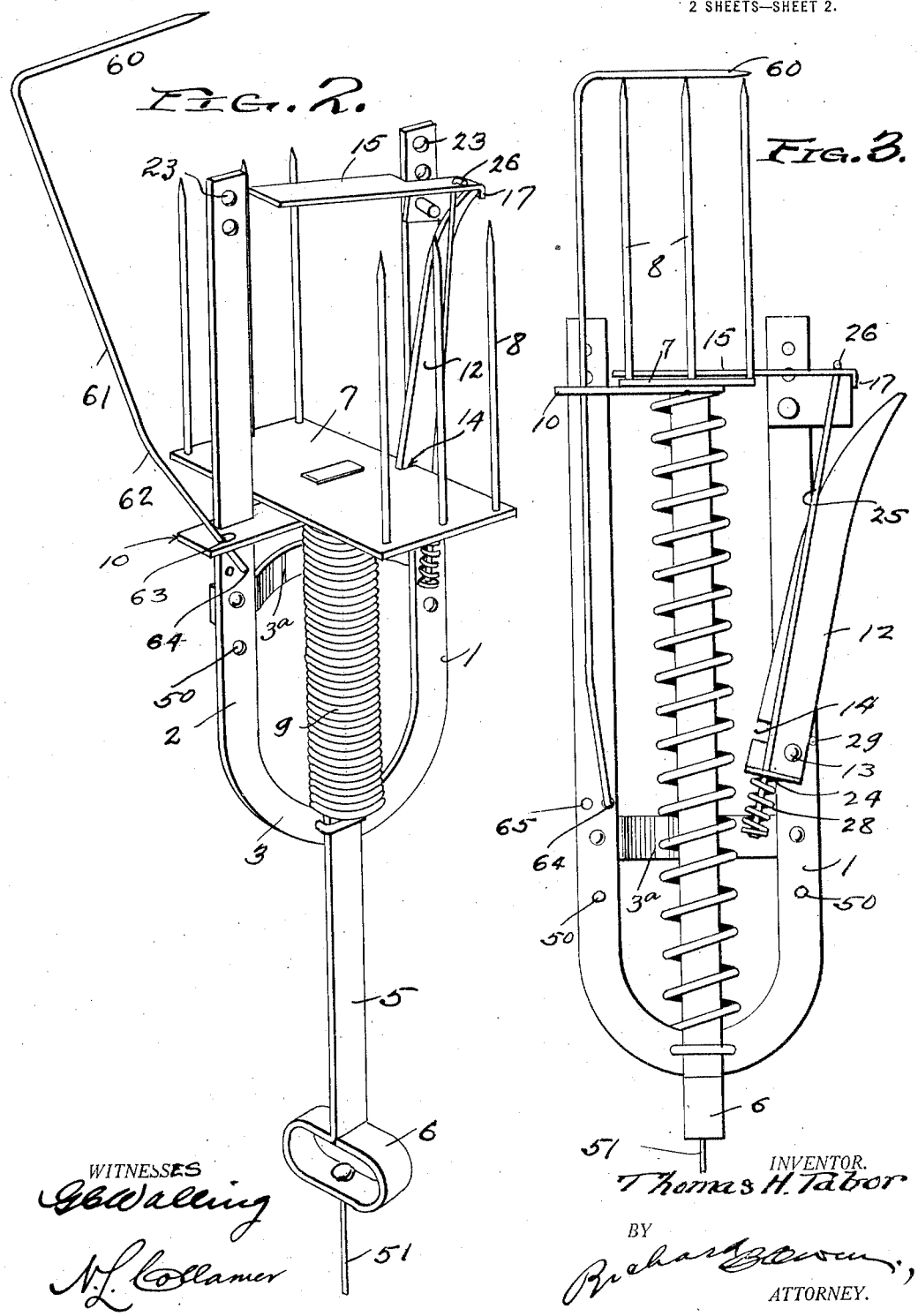

THOMAS H. TABOR, OF ELLIJAY, GEORGIA.

TRAP.

1,334,418. Specification of Letters Patent. Patented Mar. 23, 1920.

Application filed March 6, 1919. Serial No. 280,991.

*To all whom it may concern:*

Be it known that I, THOMAS H. TABOR, a citizen of the United States, residing at Ellijay, in the county of Gilmer and State of Georgia, have invented certain new and useful Improvements in Traps, of which the following is a specification.

This invention relates to traps, and more especially to those of the impalement type; and its primary object is to adapt a trap of this nature to a variety of uses.

First, I provide means for inverting the trap and using it in the air for catching birds and fowls.

Second, I prefer to employ in this connection a spear impaling the birds simultaneously with the impalement thereof by the prongs.

Third, I provide means for resetting the trap when elevated, without the necessity for the operator leaving the ground.

Fourth, I provide an improved type of trigger which will operate successfully in either position of the trap.

Fifth, means are provided for use in connection with the trap in its normal position, whereby it may be tripped by a heavy weight or a light weight animal.

Finally in assembling this trap, I make use of a mouse trap in connection with this impalement trap, the springing of one setting off the other.

Details are set forth in the following specification and claims. In the drawings:

Figure 1 is a perspective view of this trap ready for use at the surface of the ground.

Fig. 2 is a perspective view of the trap inverted and ready for use in the air, the trap in this view being set.

Fig. 3 is a side elevation of the trap in the air, after it has been sprung.

I will say in starting that I make use of many of the structural details of a well-known mole trap, and with respect to these parts, I lay no claim to novelty. For instance the body is made up of legs 1 and 2 standing parallel and connected by an arch 3 and a brace 3ª, the arch carries a staple 4 acting in the nature of a guide for a plunger 5 having a handle 6 at its outer end and carrying at its inner end a plate 7 provided with a number of prongs 8 which impale the animal when the trap is sprung. A strong expansive spring 9 is coiled on the plunger between the arch and the plate. The latter also carries an ear 10 having an opening 11 sliding on one leg such as 2. A trigger 12 is pivoted at 13 to the other leg and has a notch 14 engaging the opposite edge of the plate 7 to hold it set. A trip plate 15 is pivoted at 16 to the leg 1 and has a lip 17 engaging the free end of the trigger, and when the mole crowds under the trip plate 15 and raises it, the trigger is freed and this in turn releases the trip plate so that the latter descends under the expansive influence of the spring 9 and the prongs impale the animal. No novelty is claimed for the parts thus far mentioned.

Coming now to the details of the present invention, I provide two anchors 21 and 22 detachably connected by means of bolts 20 to the lower ends of the legs 1 and 2 respectively, which anchors are the equivalent of the lower ends of said legs in the trap now well known excepting that they are detachable for a purpose which will appear below. The bolts pass through holes 23 in the anchors and legs and the anchors are shown removed in Figs. 2 and 3. Instead of permitting the trigger 12 to act by gravity alone, I provide its upper end with an ear 24 having a perforation through which extends a rod 25 whose lower end passes through the short arm of the trip plate and is headed or bent beneath said plate as shown at 26, in Figs. 2 and 3. The upper end of the rod is provided with a head or button 27, and between this button and the ear is a light expansive spring 28 whose normal tendency is to draw the light end of the trip 15 toward the trigger and throw the free end of the trigger outward against the lip 17. Said free end I prefer to bend outward a little, but the purpose of this detail is to cause the trigger to work by spring action rather than gravity when the trap is inverted as shown in Fig. 3. A stop 29 prevents the trigger from swinging too far outward. With the pointed anchors 21 and 22 applied to the legs, this device may be used like the mole trap well known, and such needs no further description here. I might say, however, that in that case the anchors are driven into the ground, and the purpose of the trap is to impale an animal who runs in a burrow or a runway under the surface of the ground.

My improved trap is capable also of use in catching animals which run on the surface of the ground. For this purpose I make use of a platform 30 as seen in Fig. 1, the same having a slot 31 through which one of the anchors are passed, and these anchors may be provided with a pin 32 to prevent them from being drawn out of the slot undesirably. A chain 33 may be attached to the platform at its lower end, and its upper end to an eye 34 in the light end of the trip plate, and when a heavy animal steps on the platform it will tilt slightly over pin 32 and he will draw down on the end of the platform and trip trigger with the result described above. To make the trap more sensitive I add a lever 35 having in its body a slot 36 resting on a pin 37 which may be one of the bolts fastening the anchors to the legs, and as seen at the left of Fig. 1 the upper end of the chain 33 could be connected to the outer end of this lever. Even very light pressure on the platform will move the lever so that its inner end raises the inner end of the trip plate 15 and springs the trap.

A similar lever is shown on the right hand leg 2 in Fig. 1, and its outer end is connected by a wire or chain 40 with a mouse trap M which may be secured upon the platform 30. The type of trap as here employed is not essential, excepting that when sprung it goes off with quite a snap and the impulse given the wire 40, which tilts the right hand lever and elevates the trip plate 15 and springs the main trap.

When there are two levers the platform may be connected with the outer end of each, to which end another wire 41 is shown provided with a hook 42. This may be used selectively in place of the wire 40, or in conjunction therewith, to which end the levers are shown as provided with several holes 43. The trip T of the mouse trap M is connected by a wire 44 with a staple 45 in the platform 30 between the two anchors 21 and 22, and this wire 44 may carry bait as indicated at B. Now when the animal nibbles the bait he trips the mouse trap and the spring of the mouse trap will trip the main trap and catch the animal. Thus it will be seen that this trap is adapted to kill an animal below the ground or on the surface of the ground, and while a mole is known to be quite strong and will raise the trip with considerable force, I have made provision for light animals even as small as an ordinary mouse.

On sheet 2 is shown the use of the trap for catching birds and fowls in the air. In this case the anchors 21 and 22 are removed and the entire trap inverted, and although not illustrated, I propose to pass fastening devices through holes 50 in the legs 1 and 2 and drive them into or attach them to a tall pole or other support so that the trap will stand high above the earth instead of its surface. In this case a wire 51 will lead from the handle 6 down to the ground, so that the trap may be reset by an operator on the earth's surface by pulling on said wire. The importance of the spring connection between the ear 24 on the trigger 12 and the light end of the trip 15 is now apparent, because the normal expansion of the spring 28 tends to hold the tip of the trigger 12 against the lip 17 when the trap is set as shown in Fig. 2. At this time the trip plate 15 stands practically at the top of the trap, as the upper ends of the legs have been removed, and then a lure which is laid upon or smeared upon said plate will attract birds and fowls. When they light thereon, the trap will be tripped and the fingers or prongs will be driven upward through the body of the fowl or bird in a manner which will be clear. Drawing downward on the wire 51 resets the trap and pulls the prongs out of the body, which falls off.

In this connection, however, I prefer to make use of a spear which comprises a point 60 standing at substantially right angles to a shank 61 and made of stiff wire. The shank is bent a little as at 62, then passes through an elongated perforation 63 in the ear 10, and is finally bent inward and pivoted at 64 in one of a pair of holes in the leg 2. If pivoted in the other hole 65, the action would be the same but the pointed end of the spear would move through a different arc. When the trap is set as seen in Fig. 2, the perforation engaging the shank near its pivot throws the point back out of the way above the trip plate 15. As the trap is sprung, the rapid upward movement of the ear causes the perforation 63 to travel along the shank 61 and the spear point 60 is brought quickly inward so as to impale the fowl or bird transversely at the same time that the prongs 8 impale it vertically. I find this detail important, because the fowl by fluttering its wings may not now disengage itself from the prongs and escape.

The foregoing description and the drawings have reference to what may be considered the preferred or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. In an impalement trap, the combination with a U-shaped frame, a spring-projected plate mounted within said frame and having prongs; of a trigger pivoted to said frame and having a notch adapted to receive the prong plate, a trip plate pivoted to said frame and having a lip adapted to engage the free end of the trigger, the latter having a lateral ear, a rod passing through said ear and the lip carrying end of said trip plate and having a button beyond said ear, and a coiled expansive spring on the rod between the ear and button.

2. In an impalement trap, the combination with a U-shaped frame, a spring-actuated plunger movable between the legs thereof and having an ear traveling on one leg and provided with a perforation, a plate on said plunger having prongs, and a trigger and tripping mechanism for said plate; of a spear comprising a point and a shank at substantially right-angles to each other, the shank passing through said perforation in the ear and pivoted in said leg, for the purpose set forth.

3. In an impalement trap, the combination with a U-shaped frame, whereof one leg has a plurality of perforations, a spring actuated plunger sliding in said frame, a prong carrying plate on the plunger, and an ear on the plate having a perforation; of trigger mechanism for the plate and trip mechanism for the trigger, and a laterally movable impalement element comprising a point and a shank standing at right angles to each other, the shank having a slight bend in its length and passing through said perforation in the ear and selectively engaged with one of the perforations in said leg, as described.

4. In an impalement trap, the combination with a U-shaped frame, a spring-projected prong carrying plate movably mounted between the legs of the same, and a trigger pivoted to one leg of said frame and having a notch adapted to engage said plate when the trap is set; of a stop in said leg adjacent the trigger to limit its outward movement, a trip plate pivoted to said leg and having a lip to engage the tip of the trigger when set, and connections between said trip plate and trigger to throw said trigger outward against the stop when the trap is sprung.

In testimony whereof I affix my signature in presence of two witnesses.

THOMAS H. TABOR.

Witnesses:
 R. J. OSBORN,
 O. G. WEAVER.